United States Patent [19]
Sharkey

[11] Patent Number: 5,575,913
[45] Date of Patent: Nov. 19, 1996

[54] FILTRATION APPARATUS AND METHOD FOR REMOVING PARTICULATE CONTAMINANTS FROM COMMERCIAL LAUNDRY WASTE WATER

[76] Inventor: James P. Sharkey, 106 Cambon Ave., St. James, N.Y. 11780

[21] Appl. No.: 508,730

[22] Filed: Jul. 28, 1995

[51] Int. Cl.⁶ .......................... B01D 35/34; B01D 35/22; B01D 35/027
[52] U.S. Cl. .......................... 210/409; 210/797; 210/791; 210/407; 210/109; 210/111; 210/138; 210/139; 210/477
[58] Field of Search .................................... 210/139, 109, 210/111, 196, 232, 408, 409, 477, 499, 138, 407; 209/380

[56] References Cited

U.S. PATENT DOCUMENTS

| | | |
|---|---|---|
| 1,919,201 | 7/1933 | Clements . |
| 3,357,567 | 12/1967 | Wake . |
| 3,477,571 | 11/1969 | Maag . |
| 3,833,123 | 9/1974 | Walker . |
| 4,354,513 | 10/1982 | Bingham . |
| 4,468,325 | 8/1984 | Yock . |
| 4,661,253 | 4/1987 | Williams . |
| 4,784,169 | 11/1988 | Striedieck . |
| 5,425,876 | 6/1995 | Rector . |
| 5,429,247 | 7/1995 | Lemay . |
| 5,462,673 | 10/1995 | Piers . |

Primary Examiner—Thomas M. Lithgow
Attorney, Agent, or Firm—Galgano & Burke

[57] ABSTRACT

A filtration apparatus and method having a housing, a filter element, an inlet, a first discharge outlet and a second discharge outlet. The housing includes a bottom and an upwardly extending surrounding wall. The filter element is disposed in the housing and spans the surrounding wall with the filter element spaced above the bottom of the housing to define an upper chamber and a lower chamber, and the filter element being angled, preferably 45 degrees from the horizontal, so that one end of the filter element is lower relative to the other end. The inlet is in fluid communication with the upper chamber for receiving waste water containing particulate contaminants. A first discharge outlet is in fluid communication with the lower chamber for discharging filtered waste water. The second discharge outlet is in fluid communication with the upper chamber adjacent the lower end of the filter element for discharging filtered particulate contaminants.

15 Claims, 2 Drawing Sheets

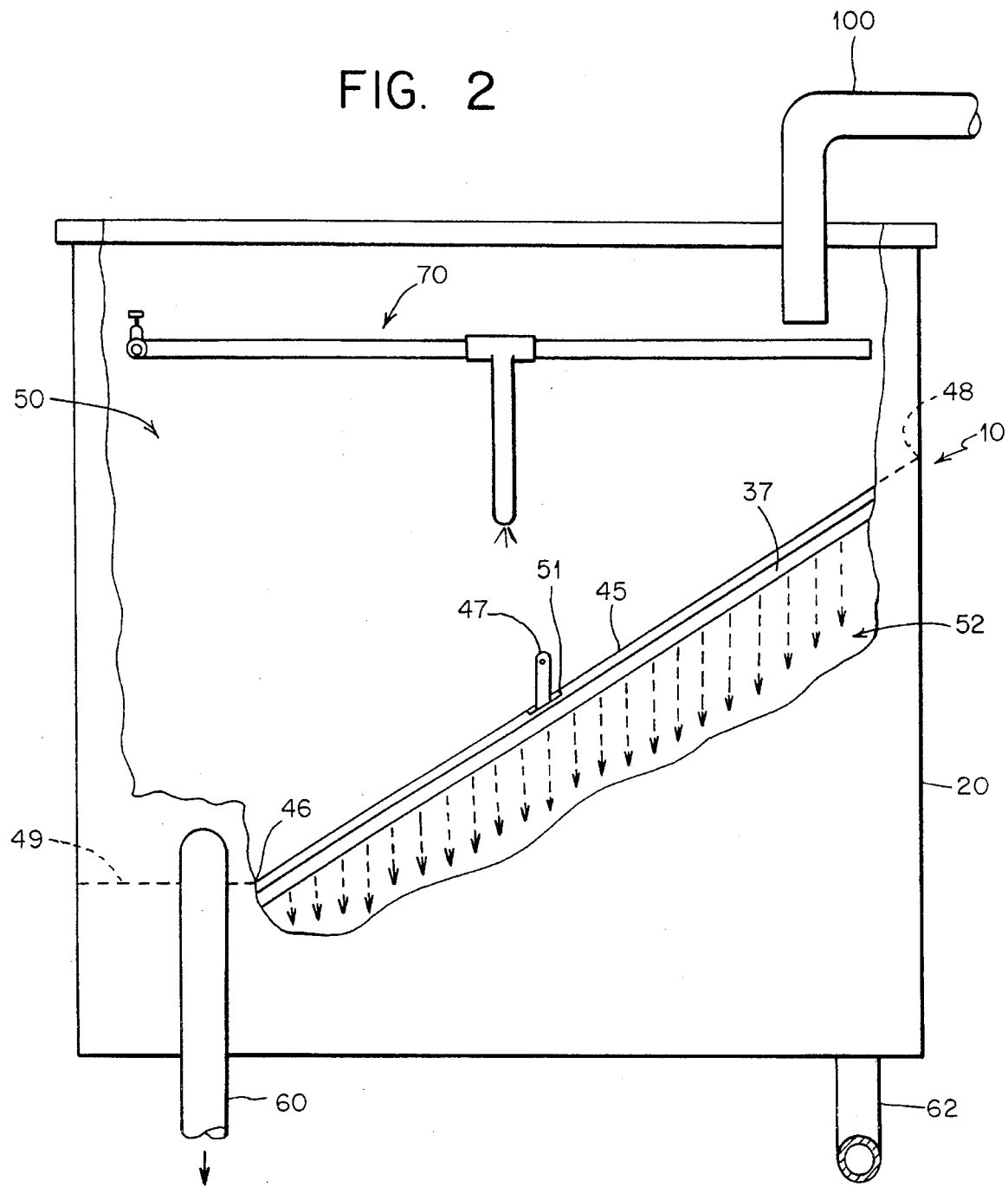

FILTRATION APPARATUS AND METHOD FOR REMOVING PARTICULATE CONTAMINANTS FROM COMMERCIAL LAUNDRY WASTE WATER

BACKGROUND OF THE INVENTION

The present invention relates generally to a filtration apparatus for separating solid particles from a liquid. More particularly, the invention relates to filtration apparatus for removing particulate contaminants from commercial laundry waste water and a method for accomplishing the same.

State and local governments across the country as well as the federal government have enacted environmental laws or expanded existing environmental laws to reverse or limit the threat of environmental pollution. These environmental laws are typically directed toward commercial enterprises which create various wastes streams as a by-product of manufacturing products or providing services. The commercial laundry industry and particularly commercial laundromats are specifically affected by environmental laws which limit the amount of suspended solids or particulate contaminants in commercial laundry waste water which can be discharged into the environment. Particulate contaminants in commercial laundry waste water generally consist of lint, hair, dirt and soap scum. To meet current environmental laws, the amount of particulate contaminants in the commercial laundry waste water must be reduced to an acceptable level before it is discharged into the ground water and/or municipal sewage system.

Separating solid particles, impurities, particulate contaminants, etc. from a liquid or gas is generally accomplished by passing it through a porous substance or a filter. For example, U.S. Pat. No. 4,322,293 granted to Morgan, Jr. discloses a multiple element filter having a housing which supports and suspends a number of filter elements, e.g., screen or cloth or other similar interwoven filtering material, which have open upper ends which accept a liquid to be filtered. However, once the filter elements become clogged or full, the housing must be opened and the filter elements removed and cleaned or replaced.

A number of devices for filtering or separating solid particles, impurities, particulate contaminants, etc. from a liquid include a filter or filter elements and also means for imparting motion to the filter elements to aid in the filtering or separating process and/or removal of separated contaminants from the surface of the filter elements. One example, is U.S. Pat. No. 2,480,320 granted to Carrier which discloses a filter apparatus for removing impurities from cleaning fluids used in dry cleaning clothing. The filter apparatus includes a casing having a plurality of individual filter elements which are vertically supported in spaced relation to each other and in such a way that they can be oscillated in the casing as a unit while in the cleaning liquid to remove sludge from the filter elements whereupon it will drop into the lower portion of the casing below an outlet pipe. At frequent intervals the sludge can be removed through a sludge outlet.

Another example is U.S. Pat. No. 4,289,630 granted to Schmidt, Jr. et al. which discloses a filtration apparatus having a plurality of filter elements supported between an upper inlet manifold and a lower outlet manifold. The filter apparatus also includes means for cleaning the filter element after a filter cake has been deposited thereon. Specifically, a vibratory impactor is mounted on upper inlet manifold to impart vertically directed shock waves to the manifold and to the filter elements connected thereto to dislodge the filter cakes.

Still another example is U.S. Pat. No. 5,350,526 granted to Sharkey, et al., the inventors of the present invention, which disclose a filtration apparatus for removing particulate contaminants from commercial laundry waste water in which the apparatus has at least one porous mesh-like filter bag coupled between an upper inlet manifold for receiving waste water containing particulate contaminants and a lower outlet manifold for discharging the particulate contaminants separated from the waste water. The filtration apparatus also includes a paddle for agitating the filter bag so as to prevent the mesh-like material of the filter bag from becoming clogged.

Also, a number of devices for filtering or separating solid particles, impurities, particulate contaminants, etc., from a liquid include a filter or filter elements and also spray means for aiding in the filtering process and/or removal of accumulated contaminants. For example, U.S. Pat. No. 4,591,446 granted to Müller discloses a pressurized filtering device in which the liquid to be filtered is transferred through a plurality of vertically suspended tube-like filter elements wherein particulate contaminants accumulate on the outer surface to the filter elements. A spray nozzle, located above the filter elements, provides a second operation of rinsing the outer surface of the tube-like filter elements with a combination of a rinsing liquid and pressurized air to remove the particulate contaminants accumulated on the outer surface of the filter element for subsequent discharge of the particulate contaminants out a separate opening at the bottom of the device. Similarly, U.S. Pat. No. 4,213,861 granted to Muller, et al. discloses a plurality of vertically extending spray tubes, disposed adjacent the tube-like filter elements for rinsing out accumulated particulate contaminants on the outer surface of the filter elements.

A filtration device which has a filtering medium and incorporates both hydraulic and mechanical forces during the process of removing accumulated particulate contaminants is U.S. Pat. No. 3,557,955 granted to Hirs, et al. Hirs, et al. discloses a filtration apparatus for removal or relatively small particulate contaminants in which the filtration apparatus includes a filtering medium of finely divided particulate material, e.g., polyvinyl chloride, polyethylene or wood sawdust. Following filtration, the filter medium is back washed. In addition to the hydraulic forces caused due to back washing, agitators located within the filter medium are rotated to apply mechanical forces during back washing to aid in removal of the accumulated particulate contaminants.

Thus, for satisfying the laundry industry, there is a need for a filtration apparatus that is capable of accepting a relatively large flow of laundry water, capable of removing the relatively small suspended particulate contaminants, and capable of continuous automated operation.

SUMMARY OF THE INVENTION

It is an object of the present invention to provide an improved filtration apparatus and method for separating and removing particulate contaminants from a relatively large continuous flow of laundry waste water for discharge of the filtered waste water into the environment, i.e., ground water and/or municipal sewage system.

It is also an object of the present invention to provide such a filtration apparatus that includes a filter element having a large surface area, disposed on an angle which efficiently separates relatively small particulate contaminants from a large continuous flow of laundry waste water.

It is another object of the present invention to provide such a filtration apparatus having a filter element for separating particulate contaminants from laundry waste water in which the separated particulate contaminants can be easily and quickly manually or automatically removed from the apparatus without injuring or removing the filter element.

It is still another object of the present invention to provide such a filtration apparatus that includes spray means which aid in the filtering process and removal of accumulated particulate contaminants.

It is still yet another object of the present invention to provide such a filtration apparatus that is easily and inexpensively manufactured, highly efficient in operation, and which requires little lifetime maintenance.

Certain of the foregoing and related objects are readily obtained in a filtration apparatus for commercial laundry waste water containing particulate contaminants embodying the present invention having a housing having a bottom and an upwardly extending surrounding wall, and a filter element disposed in said housing and spanning the surrounding wall, the filter element being spaced apart from the bottom of the housing forming an upper chamber and a lower chamber, and the filter element being angled so that one end of the filter element is lower relative to the other end. An inlet is in fluid communication with the upper chamber for receiving waste water containing particulate contaminants, and a first discharge outlet is in fluid communication with said lower chamber for discharging filtered waste water, and a second discharge outlet is in fluid communication with the upper chamber adjacent the lower end of the filter element for discharging filtered particulate contaminants.

Preferably, the bottom is rectangular is shape, and the surrounding wall includes a front wall, a rear wall and a pair of side walls. Most advantageously, the filter element is removable and includes interwoven filtering material and a surrounding frame. Most desirably, the filter element is planar in shape and is angled at between about 30 to 60 degrees from the horizontal, preferably at about 45 degrees from the horizontal.

In a preferred embodiment, the housing further includes a support attached to the interior surface of the surrounding wall for support of the filter element. The support desirably includes a lower front support, an upper rear support, and two side supports which are angled from the lower front support to the upper rear support. Advantageously, the support is fabricated from a continuous rubber material which forms a seal with said frame of the filter element.

In a particular preferred embodiment, the apparatus further includes spray means for discharging a liquid across an upper surface of the filter element for causing accumulated particulate contaminants on the upper surface of the filter element to move toward the lower end and toward the second discharge outlet. Preferably, the spray means includes a pair of pipes disposed above the filter element. Most advantageously, the apparatus further includes a discharge valve attached to the second discharge outlet including solenoids operatively coupled to the spray means and a solenoid operatively connected to the discharge valves to effect opening and closing thereof and a timer electrically coupled to the solenoids to effect activation and deactivation thereof.

Certain of the foregoing and related objects are also attained in a method of filtering waste water containing particulate contaminants embodying the present invention which includes the steps of introducing the waste water into a filtration apparatus of the type described above, filtering the waste water through the filter element to separate particulate contaminants from the waste water on an upper surface of the filter element, and discharging the separated particulate contaminants separated from the waste water from the filtra-tion apparatus via the second discharge outlet. Preferably, the method also includes the step of introducing a spray of liquid to the upper surface of the filter element to aid in discharging separated particulate contaminants from the filtration apparatus.

BRIEF DESCRIPTION OF THE DRAWINGS

Other objects and features of the present invention will become apparent from the detailed description considered in connection with the accompanying drawings, which disclose one embodiment of the invention. It is to be understood that the drawings are to be used for the purpose of illustration only and not as a definition of the limits of the invention.

In the drawings, wherein similar reference characters denote similar elements throughout the several views:

FIG. 2 is a fragmentarily-illustrated side view of the filtration apparatus shown in FIG. 1.

DETAILED DESCRIPTION OF THE PREFERRED EMBODIMENTS

Figure 1:
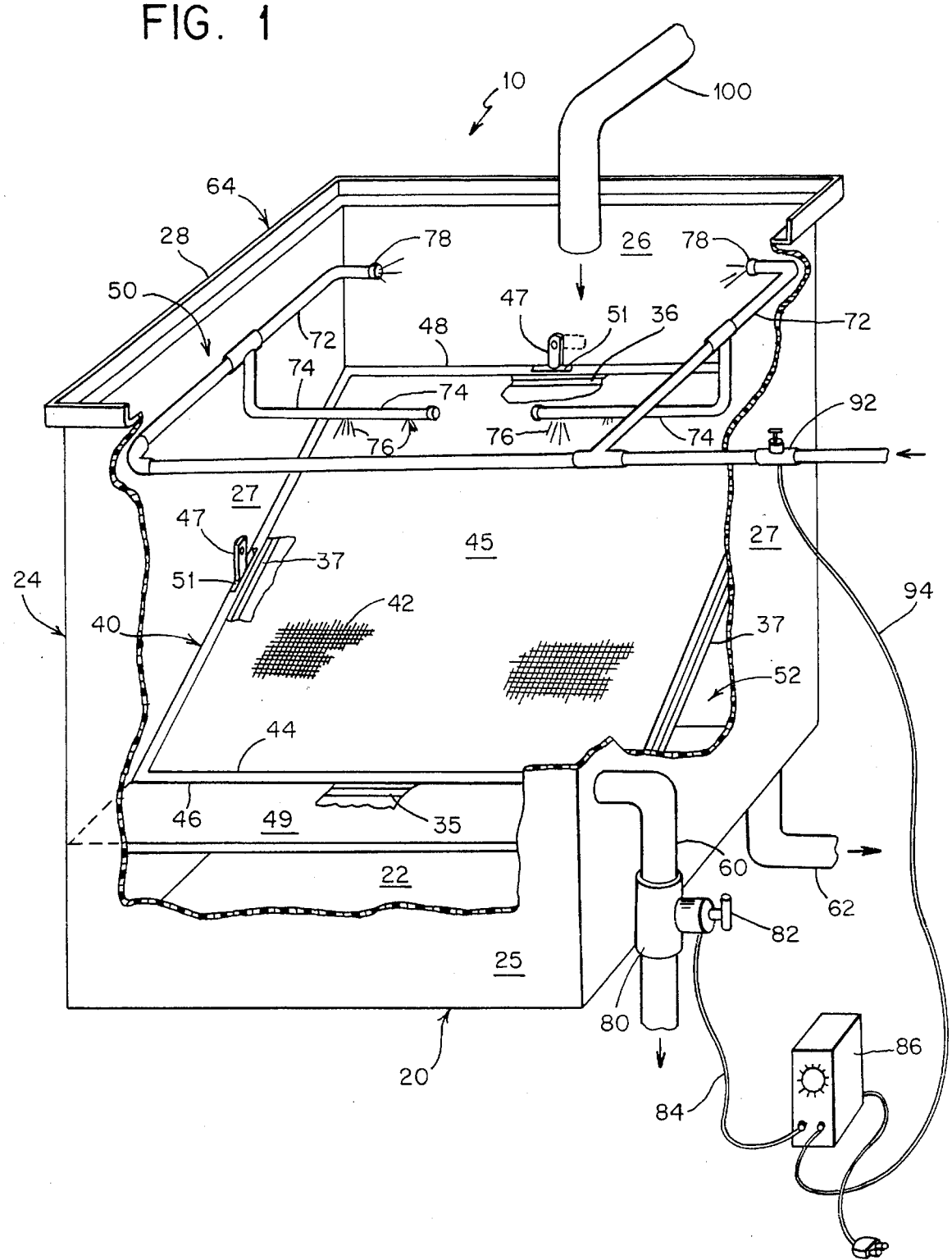
FIG. 1 is a fragmentarily-illustrated perspective view of the filtration apparatus embodying the present invention with portions broken away to show internal construction.

Turning now to the drawings, and in particular to FIG. 1, therein illustrated is a filtration apparatus 10 embodying the present invention, which is particularly adaptable to receiving laundry waste water discharge from a number of commercial laundry washing machines (via pipe 100) and filtering or separating out particulate contaminants, such as lint, hair, dirt and soap scum, from the laundry waste water. Filtration apparatus 10 generally includes a housing 20, a filter element 40, a laundry waste water inlet having an open top end 64 which defines a filtered waste water discharge outlet 62, particulate contaminate outlet 60 and spray means 70.

Referring again to FIG. 1, housing 20 includes a bottom 22 and an upwardly extending surrounding wall 24. Specifically, housing 20 has a generally open box-like configuration in which bottom 22 is rectangularly shaped and upwardly extending side wall 24 consists of a front wall 25, a rear wall 26 and two side walls 27. It is appreciated that bottom 22 of housing 20 can be circularly or squarely shaped. Preferably, housing 22 is fabricated from a rust resistant material such as a plastic material.

Filter element 40 is disposed in the interior of housing 20, spanning between the interior surface of surrounding wall 24. Generally, filter element 40 consists of an interwoven filtering material 42, preferably a micro screen such as a mono filament mesh fabricated from nylon, and a surrounding frame 44. Frame 44 provides a border around interwoven filtering material 42 and which serves as structural support for interwoven filtering material 42. Such factors as the amount and consistency of the laundry waste water flow rate, and size and amount of solid particulate contaminants, etc. will dictate the desired mesh size of interwoven filtering material 42. Desirably, interwoven filtering material 42 has a mesh size ranging from about 70 microns to 25 microns.

Preferably, frame 44 is fabricated from a non-resistant metal such as aluminum.

Housing 20 includes a support 30 attached to the interior surface of surrounding wall 24 for providing support to filter element 40. Specifically, support 30 includes a lower front support 35, an upper rear support 36, and two side supports 37 which are angled from lower front support to upper rear support 37. Preferably, support 30 is a continuous rubber material which forms a seal with frame 44 of filter element 40 so that, as explained below, particulate contaminants will not pass around frame 44 but will be retained on interwoven filtering material 42.

Preferably, housing 20 includes a plurality of releasable locking means 47 for releasably locking the frame 44 of filter element 40 in a fixed position in housing 20. Releasable locking means 47 may comprise pivotable latch-like arms mounted on each of the sidewalls 25, 26 and 27 for movement between a release position (shown in phantom in FIG. 1) and a locking position with respect to the frame 44, in the latter position of which it either closely abuts or is received within a corresponding slot 51 in frame 44.

Referring now to FIGS. 1 and 2, filter element 40 is disposed within the interior of housing 20 and spaced apart from bottom 22 forming an upper chamber 50 and a lower chamber 52. Filter element 40 is angled so that a lower end 46 is lower relative to an upper end 48. Preferably, filter element 40 is angled at between about 30 degrees and 60 degrees from the horizontal. Most preferably, filter element 40 is angled at about 45 degrees from the horizontal.

Referring again to FIG. 1, the upper edge 28 of surrounding wall 24 forms waste water inlet 64, in fluid communication with upper chamber 50, for receiving laundry waste water containing particulate contaminants from discharge pipe 100. It will be appreciated that housing 20 can include a cover or lid supported on upper edge 28 of surrounding wall 24 and provided with a inlet for receiving laundry waste water containing particulate contaminants.

Referring again to FIGS. 1 and 2, filtered waste water discharge outlet 62, in fluid communication with lower chamber 52, provides for discharge of collected filtered waste water in lower chamber 52. Filtered waste water discharge outlet 62 can be positioned over a floor drain or connected to a conduit for discharge of the collected filtered waste water into the ground water and/or municipal sewage system. Specifically, filtered waste water discharge outlet 62 is disposed in bottom 22 of housing 20.

Particulate contaminate discharge outlet 60, in fluid communication with upper chamber 50 adjacent lower end 48 of filter element 40, provides for discharge of particulate contaminants. Specifically, particulate contaminate discharge outlet 60 is disposed in side wall 26 adjacent lower end 48 of filter element 40.

Spray means 70 for discharging a spray of liquid, preferably water under pressure from a suitable source (not shown), across an upper surface 45 of filter element 40 flushes or causes particulate contaminants collected on upper surface 45 of filter element 40 to move toward lower end 46 and toward particulate contaminate discharge outlet 60. Specifically, spray means 70 includes a pair of pipes 72 each extending horizontally along the interior of housing above filter element 40. Extending from each pipe 72 are L-shaped pipes 74 having a pair of nozzles 76. In addition, nozzles 78 are attached at each end of pipe 72. Preferably, pipes 72 and L-shaped pipes 74 are fabricated from a plastic material such as polyvinyl chloride (PVC). It will be appreciated that one skilled in the art could provide other equally suitable alternative configurations for positioning the spray nozzles above filter element 40 to cause accumulated particulate contaminants on upper surface 45 of filter element 40 to move toward lower end 46 and toward particulate contaminate discharge outlet 60.

Spray means 70, as explained below, can be operated to prohibit particulate contaminants from accumulating on upper surface 45 of filter element 40 and clogging the interwoven filtering material 42 of filter element 40 by either constantly supplying a spray of liquid during operation or alternatively at periodic intervals. Removal of particulate contaminants from filtering apparatus 10 can be accomplished manually or preferably by coordination of spray means 70 and a discharge valve 80. Specifically, discharge valve 80 is in fluid communication with particulate contaminate discharge outlet 60 and is normally closed so that laundry waste water is not carried out particulate contaminate discharge outlet 60 during operation. When filter element 40 has excessive amount of accumulated particulate contaminants thereon, discharge valve 80 can be opened and the accumulated particulate contaminants can be flushed out by activation of spray means 70. Preferably, discharge valve 80 is operated by a conventional solenoid 82 connected by an electrical wire or lead 84 to a conventional timer 86 for automatic periodic flushing and discharge of the collected particulate contaminants in conjunction with spray means 70 by concurrent control of valve 92 operated by solenoid 96 also connected via wire 94 or the like to timer 86, the latter of which would be connected to an electrical outlet.

Operation

The operation of the present invention will be explained with respect to FIG. 1. Laundry waste water from washing machines is introduced into the filtration apparatus 10 by laundry waste water discharge tube 100 as shown by the solid arrow. The laundry waste water is deposited on upper end 48 of upper surface 45 of filter element 40. Filtered waste water, shown as dashed arrows in FIG. 2, passes through filter element 40 while particulate contaminants accumulate on upper surface 45 of filter element 40.

The unique design of filtering system 10 takes advantage of gravitational forces, and hydraulic forces from subsequent discharge of laundry waste water to naturally cause accumulated particulate contaminants on upper surface 45 of filter element 40 to move downward along upper surface 45 toward lower end 46 and onto a ridge 49. In addition, spray means 70 can be operated periodically to aid in causing accumulated particulate contaminants on upper surface 45 of filter element 40 to move downward along the upper surface toward lower end 46 and onto ridge 49.

Removal of particulate contaminants from upper chamber 52 of housing 20 may be accomplished manually or preferably by coordination of spray means 70 and discharge valve 80. Specifically, spray means 70 is operated to supply a spray of liquid during operation or at periodic intervals in coordination with discharge valve 80. Discharge valve 80 is attached to particulate contaminate discharge outlet 60 and is normally closed so that waste water is not carried out particulate contaminate discharge outlet 60 during normal filtering operation. When ridge 49 and filter element 40 fills up with excessive particulate contaminants, discharge valve 80 can be opened and the accumulated retained particulate contaminants can be flushed out. Preferably, as indicated above, water supply valve 92 and discharge valve 80 are operated by conventional solenoids 82, 96, respectively, connected by wires 84, 94, respectively, to a conventional timer 86 for concurrent operation and automatic periodic flushing and discharge of the collected particulate contaminants.

Various modifications can be made as will be apparent to those skilled in the art. For example, while only one row of pipes 74 and nozzles 76 are shown, two or more may be provided to facilitate contaminant discharge and cleaning of the filter or screen 40. However, the various parts shown in the drawing are commercially available so that the unit can be made economically.

Furthermore, although only one unit is shown in the drawings, multiple units could be employed in series having differently- and decreasingly-sized screen mesh openings to achieved a tiered screening effect.

Thus, while only one embodiment of the present invention have been shown and described, it is obvious that many changes and modification may be made thereunto without departing from the spirit and scope of the invention.

What is claimed is:

1. A filtration apparatus for filtering commercial laundry waste water containing particulate contaminants, said apparatus comprising:

a housing having a bottom and an upwardly extending surrounding wall, said surrounding wall having an upper edge which defines an inlet for receiving waste water containing particulate contaminants;

a removably mounted, substantially planar filter element having two opposite ends and having an interwoven filtering material and a surrounding frame disposed in said housing and spanning between said surrounding wall, said filter element spaced between said bottom and said inlet of said housing to form an upper chamber in fluid communication with said inlet and a lower chamber;

means for releasably and sealably supporting said frame of said filter element substantially about the entire periphery of said frame onto said surrounding wall thereby defining said upper and lower chamber, said means for supporting including supporting said frame at an angle with one end of said filter element being lower relative to the opposite end;

a first discharge outlet, in fluid communication with said lower chamber, for discharging filtered waste water;

a second discharge outlet, in fluid communication with said upper chamber adjacent said lower end of said filter element, for discharging filtered particulate contaminants; and a valve operably connected to said second discharge outlet, said valve having an open position for discharging filtered particulate contaminants from said upper chamber and a closed position for preventing discharge of waste water and particulate contaminants from said upper chamber.

2. The filtration apparatus according to claim 1, wherein said bottom is rectangular is shape.

3. The filtration apparatus according to claim 2, wherein said surrounding wall includes a front wall, a rear wall and a pair of side walls.

4. The filtration apparatus according to claim 1, wherein said filter element is rectangular in shape.

5. The filtration apparatus according to claim 1, wherein said filter element is angled at between about 30 to 60 degrees from the horizontal.

6. The filtration apparatus according to claim 5, wherein said filter element is angle at about 45 degrees from the horizontal.

7. The filtration apparatus according to claim 1, wherein said means for supporting includes a lower front support, an upper rear support, and two side supports which are angled from said lower front support to said upper rear support.

8. The filtration apparatus according to claim 7, wherein said means for supporting is fabricated from a continuous rubber material which forms a seal with said frame of said filter element.

9. The filtration apparatus according to claim 1, further including spray means for discharging a liquid across an upper surface of said filter element for causing accumulated particulate contaminants on said upper surface of said filter element to move toward said lower end and toward said second discharge outlet.

10. The filtration apparatus according to claim 9, wherein said spray means includes a pair of pipes disposed above said filter element.

11. The filtration apparatus according to claim 9, further including solenoids operatively coupled to said spray means and a solenoid operatively connected to said value to effect opening and closing thereof and a timer electrically coupled to said solenoids to effect activation and deactivation thereof.

12. The filtration apparatus according to claim 1, wherein said means for supporting includes means for releasably locking said filter element to said housing.

13. The filtration apparatus according to claim 12, wherein said locking means comprises pivotable latch-like arms mounted on said housing for movement between a released position and a locked position with respect to said frame of said filter element.

14. A method of filtering commercial laundry waste water containing particulate contaminants, comprising the steps of:

introducing waste water into a filtration apparatus comprising, a housing having a bottom and an upwardly extending surrounding wall, said surrounding wall having an upper edge which defines an inlet for receiving waste water containing particulate contaminants, a removably mounted, substantially planar filter element having two opposite ends and having an interwoven filtering material and a surrounding frame disposed in said housing and spanning between said surrounding wall, said filter element spaced between said bottom and said inlet of said housing to form an upper chamber in fluid communication with said inlet and a lower chamber, means for releasably and sealably supporting said frame of said filter element substantially about the entire periphery of said frame onto said surrounding wall thereby defining said upper and lower chamber, said means for supporting including supporting said frame at an angle with one end of said filter element being lower relative to the opposite end, a first discharge outlet, in fluid communication with said lower chamber, for discharging filtered waste water, a second discharge outlet, in fluid communication with said upper chamber adjacent said lower end of said filter element, for discharging separated particulate contaminants, and a valve operably connected to said second discharge outlet, said valve having an open position for discharging filtered particulate contaminants from said upper chamber and a closed position for preventing discharge of waste water and particulate contaminants from said upper chamber;

filtering the waste water through said filter element to separate particulate contaminants from the waste water on an upper surface of said filter element; and periodically discharging the separated particulate contaminants separated from the waste water from said filtration apparatus via said second discharge outlet.

15. The method according to claim 14, further including a step of introducing a spray of liquid to said upper surface of said filter element to aid in discharging separated particulate contaminants from said filtration apparatus.

* * * * *